United States Patent [19]
Lin

[11] Patent Number: 5,596,906
[45] Date of Patent: Jan. 28, 1997

[54] COMBINED ACCELERATING/BRAKING APPARATUS OF A VEHICLE

[75] Inventor: Sam Lin, 2 Fl., No. 29-1, Lane 52, Hsinan Rd., Nankang Dist., Taipei, Taiwan

[73] Assignee: Sam Lin, Taipei, Taiwan

[21] Appl. No.: 556,758

[22] Filed: Nov. 2, 1995

Related U.S. Application Data

[63] Continuation-in-part of Ser. No. 252,584, Jun. 1, 1994, abandoned.

[51] Int. Cl.$^6$ ................................................ G05G 9/00
[52] U.S. Cl. ........................ 74/478; 74/479.01; 477/214
[58] Field of Search .................................... 477/211, 214, 477/215, 209, 210; 74/478, 479 R, 480 R

[56] References Cited

U.S. PATENT DOCUMENTS

| | | | |
|---|---|---|---|
| 2,536,854 | 1/1951 | Parker | 74/478 |
| 2,547,593 | 4/1951 | Morris | 74/478 |
| 3,232,398 | 2/1966 | Grote | 477/211 |
| 3,536,229 | 10/1970 | Boros | 74/478 |
| 3,944,012 | 3/1976 | La Chiusa | 477/214 X |
| 4,273,211 | 6/1981 | Sarmiento | 74/478 X |
| 4,887,701 | 12/1989 | Van Der Vliet | 74/478 X |

Primary Examiner—Charles A. Marmor
Assistant Examiner—Peter Kwon
Attorney, Agent, or Firm—Calvin B. Ward

[57] ABSTRACT

A combined accelerating/braking apparatus of a vehicle includes a substantially hook-shaped rod which includes a first end, a first elbow, a second elbow, a third elbow, a fourth elbow, and a second end, where the fourth elbow is pivotally connected to a wall in the vehicle. A pedal is pivotally connected to the first elbow of the hook-shaped rod. A bracket which is secured to a wall of the vehicle includes a slot for detachable receiving the second elbow of the hook-shaped rod. A first torsion spring is biased between the pedal and a rod portion between the first elbow and the second elbow of the hook-shaped rod for providing a recovery tension when the pedal is pivotally depressed by a driver's foot sole with respect to the first elbow of the hook-shaped rod. A second torsion spring is biased between a wall of the vehicle and a rod portion between the third elbow and the fourth elbow of the hook-shaped rod for providing a recovery tension when the hook-shaped rod is pivotally moved with respect to the fourth elbow. The pedal is pivotally depressed by a driver's foot sole with respect to the first elbow of the hook-shaped rod for acceleration. The pedal is depressed by a driver's heel, causing the hook-shaped rod to pivotally move with respect to the fourth elbow of the hook-shaped rod for braking.

5 Claims, 4 Drawing Sheets

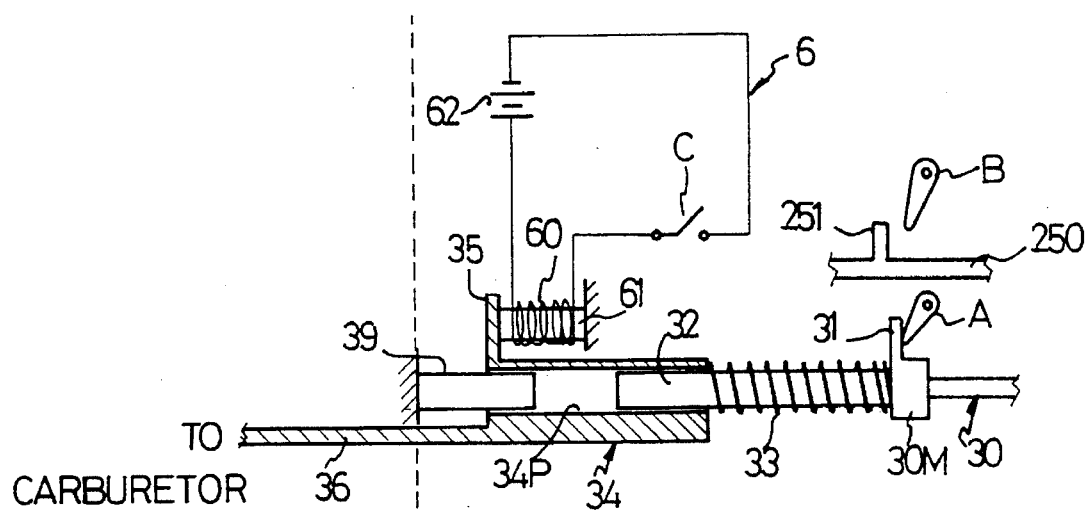
FIG. 4
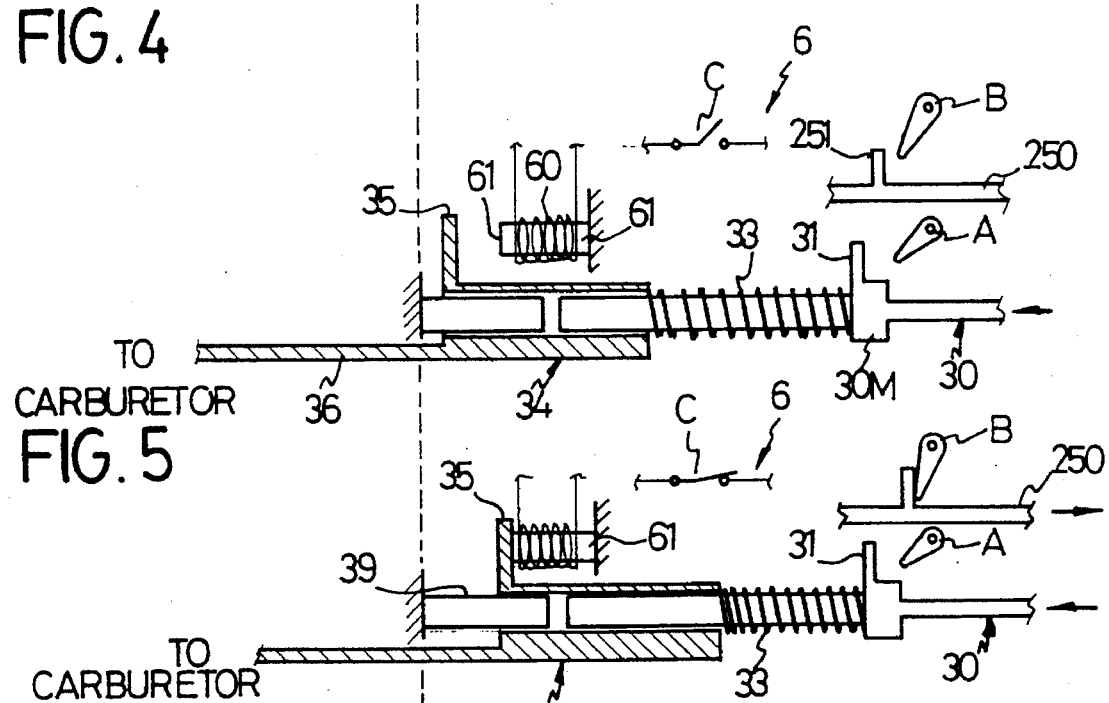
FIG. 5
FIG. 6
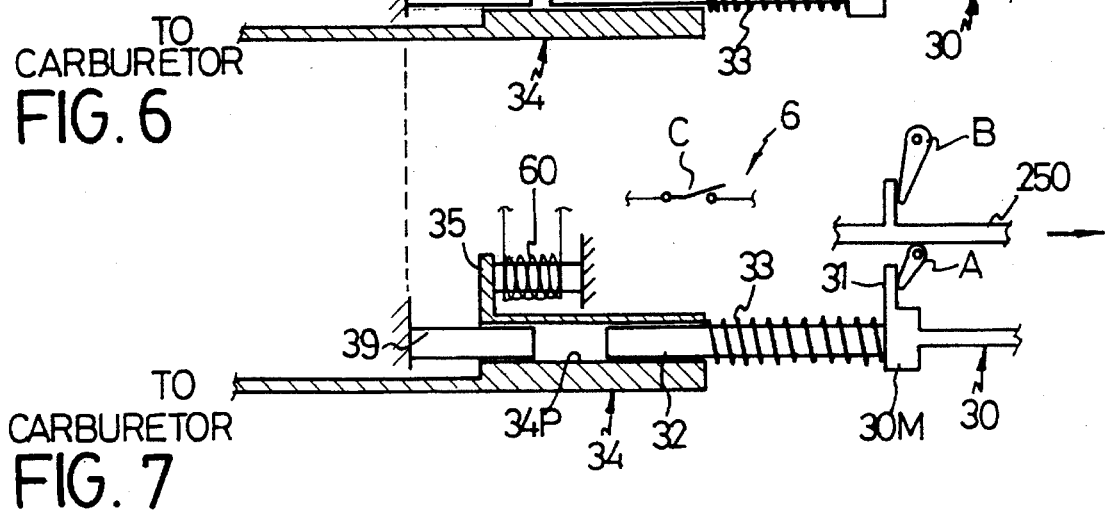
FIG. 7

5,596,906

1

COMBINED ACCELERATING/BRAKING APPARATUS OF A VEHICLE

CROSS-REFERENCE TO RELATED APPLICATIONS

This is a continuation-in-part application of U.S. patent application Ser. No. 08/252,584 filed on Jun. 1, 1994, abandoned, which is pending now.

BACKGROUND OF THE INVENTION

1. Field of the Invention

The present invention relates to a combined accelerating/braking apparatus of a vehicle which incorporates brake pedal and accelerator pedal in a mechanism for increasing operation efficiency of a driver.

2. Description of the Prior Art

A brake pedal and an accelerator pedal of a vehicle have been used for many years. Some people are apt to mistakenly step on the wrong pedal and cause an accident when an emergency happens. In some urgent cases, a driver has to make an emergency stop such as when a child or any other vehicle rushes out from a junction etc. Although the brake pedal is usually installed adjacent to the accelerator pedal, a driver has to take some extra time to switch from the accelerator pedal to the brake pedal, thus delaying the responsive brake action. It is known that in an emergency stop, timely response is a critical point to avoid an accident. It is requisite to provide a new mechanism which incorporates the brake pedal and the accelerator pedal and saves time switching between the accelerator pedal and the brake pedal.

SUMMARY OF THE INVENTION

The primary objective of the present invention is to provide a combined accelerating/braking apparatus of a vehicle which combines a brake pedal and an accelerator pedal in a single mechanism thus saving time when switching from acceleration to brake when a driver makes an emergency stop.

In accordance with one aspect of the invention, there is provided a combined accelerating/braking apparatus of a vehicle comprising a substantially hook-shaped rod which includes a first end, a first elbow, a second elbow, a third elbow, a fourth elbow, and a second end, where the fourth elbow is pivotally connected to a wall in the vehicle;

a pedal being pivotally connected to the first elbow of the hook-shaped rod;

a bracket which is secured to a wall of the vehicle and includes a slot for detachably locating the second elbow of the hook-shaped rod;

a first torsion spring being biased between the pedal and a rod portion between the first elbow and the second elbow of the hook-shaped rod for providing a recovery tension when the pedal is pivotally depressed by a driver's foot sole with respect to the first elbow of the hook-shaped rod;

a second torsion spring being biased between a wall of the vehicle and a rod portion between the third elbow and the fourth elbow of the hook-shaped rod for providing a recovery tension when the hook-shaped rod is pivotally moved with respect to the fourth elbow thereof;

2 whereby the pedal is pivotally depressed by a driver's foot sole with respect to the first elbow of the hook-shaped rod for acceleration, the hook-shaped rod is pivotally moved with respect to the fourth elbow of the hook-shaped rod for braking when the pedal is depressed by the driver's heel.

BRIEF DESCRIPTION OF THE DRAWINGS

FIG. 4 is a partial view of a second embodiment of the present invention, where a schematic view of the brake rod, the transmission rod, and an electrically magnetized device illustrating the vehicle is operated in a non-accelerating and non-braking way;

FIG. 5 is a partial schematic view of the present invention illustrating the vehicle is operated in an accelerating and non-braking way;

FIG. 6 is a partial schematic view of the present invention illustrating the vehicle is operated in an accelerating and braking way;

FIG. 7 is a partial schematic view of the present invention illustrating the vehicle is operated in a non-accelerating and braking way.

DETAILED DESCRIPTION OF THE PREFERRED EMBODIMENT

Figure 1:
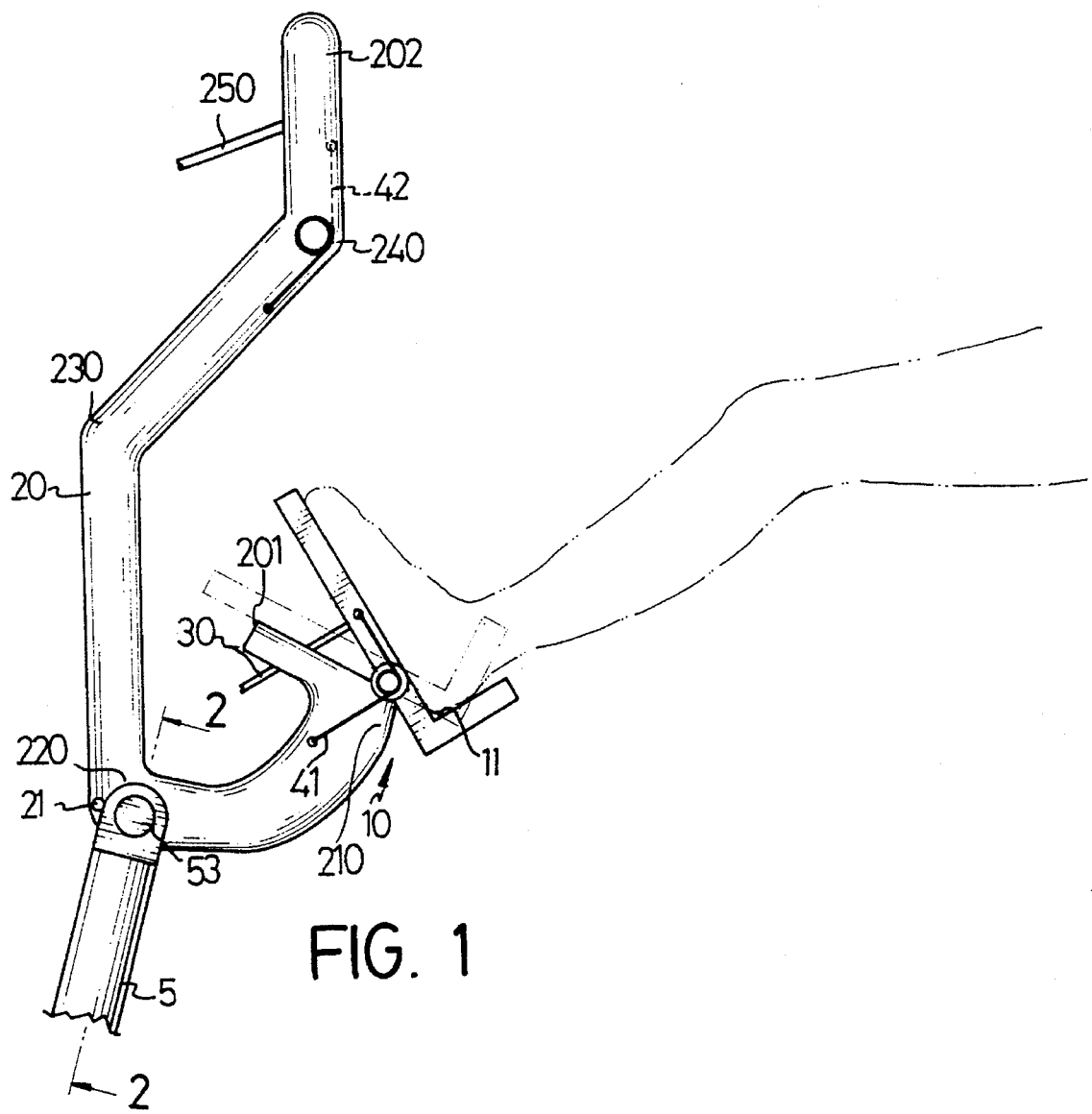
FIG. 1 is a schematic view of a combined accelerating/braking apparatus of a vehicle in accordance with the present invention, where dotted lines illustrate the pedal is depressed for acceleration.

Referring to FIG. 1, a combined accelerating/braking apparatus of a vehicle in accordance with the present invention comprises a substantially hook-shaped rod 20 which includes a first end 201, a first elbow 210, a second elbow 220, a third elbow 230, a fourth elbow 240, and a second end 202, where the fourth elbow 240 is pivotally connected to a wall (not shown) in the vehicle. A pedal 10 is pivotally connected to the first elbow 210 of the hook-shaped rod 20. Also referring to FIG. 2, a bracket 5 is secured to a wall (not shown( of the vehicle and includes a fork which has two prongs 50 thus defining a slot 51 between the prongs 50 for detachably locating the second elbow 220 of the hook-shaped rod 20. The pedal 10 is formed substantially as an L-shape thus defining a foot rest 11 allowing a driver to position his/her foot thereon. A brake rod 250 includes a first end connected to a rod portion between the second end 202 and the fourth elbow 240 of the hook-shaped rod 20 and a second end connected to a conventional braking device (not shown) of the vehicle.

Since the first elbow 210 and the fourth elbow 240 of the hook-shaped rod 20 are also used as pivot points therefore they are also called first pivot point 210 and second pivot point 240 respectively hereinafter. A first torsion spring 41 is biased between the pedal 10 and a rod portion between the first elbow 210 and the second elbow 220 of the hook-shaped rod 20 for providing a recovery tension when the pedal 10 is pivotally depressed by a driver's foot sole with respect to the first pivot point 210 of the hook-shaped rod 20.

A transmission rod 30 extends from the pedal 10 for controlling a supply of gasoline from a gasoline tank (not shown). Actually the transmission rod 30 is connected to an oil valve (not shown) which controls the supply of gasoline from the gasoline tank. When the pedal 10 is pivotally depressed forward by a driver's foot sole with respect to the first pivot point 210, the transmission rod 30 increase the gasoline supply for acceleration. A rod portion between the first end 201 and the first elbow 210 of the hook-shaped rod 20 functions as a stop for limiting travel of the pedal 10 when the latter is pivotally depressed with respect to the first pivot point 210.

Figure 2:
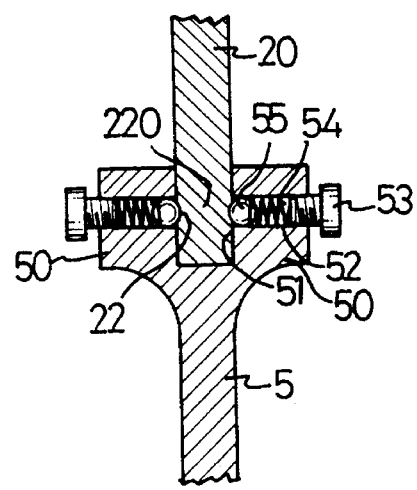
FIG. 2 is a cross-sectional view of FIG. 1 taken from a line 2—2.

Specifically referring to FIG. 2, the bracket 5 and the second elbow 220 of the hook-shaped rod 20 are illustrated in a cross-sectional manner. A hole 52 is defined in each prong 50 of the fork of the bracket 5. The hole 52 is slightly tapered thus allowing a ball 55 to be positioned from an outer opening thereof and preventing the ball 55 from passing through an inner opening thereof. The hole 52 is threaded in the outer opening. A spring 54 and a threaded bolt 53 are inserted into the hole 52 and abut against the ball 55 such that the ball 55 has a portion protruding from the inner opening of the hole 52. The threaded bolt 53 is threaded into the outer opening of the hole 52 and abuts against the spring 54. Two recesses 22 are defined in the second elbow 220 and each of the recesses 22 is respectively mated with the protruded portion of each ball 55. Normally, the second elbow 220 of the hook-shaped rod 20 is retained in the slot 51 of the bracket 5 with the protruded portion of each ball 55 abutting against the corresponding recess 22 of the second elbow 220.

Again referring to FIG. 1, a second torsion spring 42 has a vertical pin (see dotted line) attached to the wall (not shown) and a horizontal pin attached on a rod portion between the second end 202 and the fourth elbow 240 of the hook-shaped rod 20 for providing a recovery tension when the hook-shaped rod 20 is pivotally moved with respect to the fourth elbow 240 (i.e., the second pivot point) thereof. Two protrusions 21 (only one is shown) are each extended from the second elbow 220 and are in contact with a periphery of the bracket 5 preventing the elbow 220 (or the hook-shaped rod 20) from moving backward to the driver.

Figure 3:
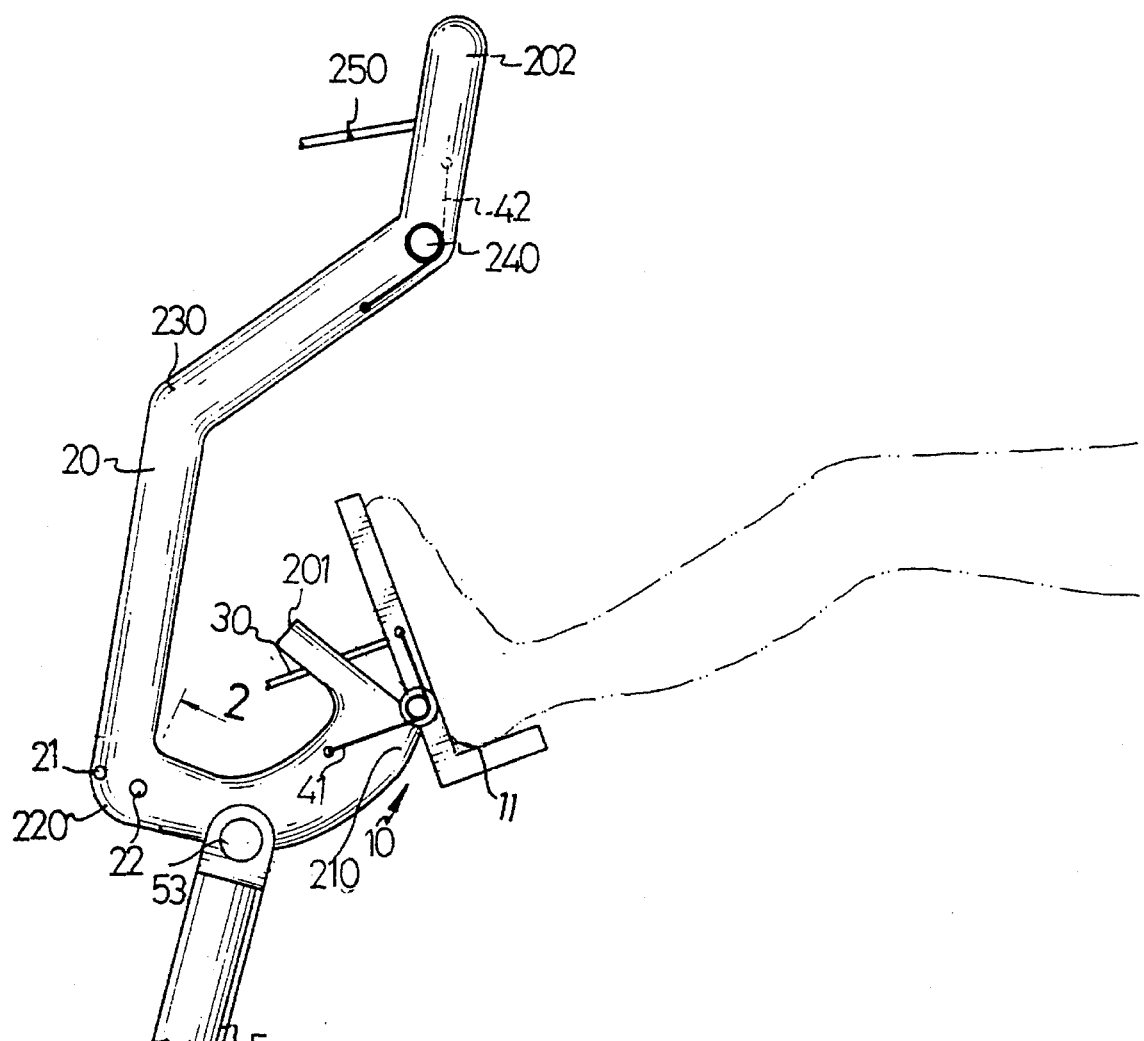
FIG. 3 is a schematic view of the combined accelerating/braking apparatus of FIG. 1.

Referring to FIG. 3, the driver depresses the pedal 10 with his/her heel, forcing the hook-shaped rod 20 to pivotally move forward with respect to the second pivot point 240, meanwhile the rod portion between the second end 202 and the fourth elbow 240 of the hook-shaped rod 20 pulls the brake rod 250 to stop the vehicle when in an emergency situation. The second torsion spring 42 reverts the second elbow 220 back to the slot 51 (see FIG. 2) of the bracket 5 when the driver releases his/her stepping force of his/her heel. It is noted that a rod portion between the first elbow 210 and the second elbow 220 is substantially in contact with the protruded tip portion of each ball 55 during the brake action.

With the above structure, a driver can drive the vehicle safely and conveniently. The above structure is quite suitable for a driver to control the acceleration and the brake of the vehicle. Since two conflict actions in ergonomics occur when the driver stretches his/her leg i.e., to step forward, to brake the vehicle with his/her heel and he/she depresses the pedal by his/her foot sole, to accelerate the vehicle, it is quite difficult for the driver to simultaneously stretch his/her leg and depress his/her foot sole. Moreover, it is very difficult for a driver to simultaneously depress the pedal 10 by his/her foot sole and move the hook-shaped rod 20 forward by his/her heel, because the combination of the two actions violates the human ergonomics.

The above embodiment is one which is suitable to a normal person operating the vehicle. However, there are some people who may brake and accelerate the vehicle simultaneously thus causing danger. For further guaranteeing safety of the vehicle, there are some more components which are added to control the vehicle. FIG. 4 illustrates the added components.

Referring to FIG. 4, A first switch A is fixedly positioning in the vehicle. A second switch B is fixedly positioned in the vehicle. A mediate 30M of the transmission rod 30 is formed as a shoulder 30M. A protrusion 31 is extended upward from the shoulder 30M of the transmission rod 30. The protrusion 31 is in contact with the first switch A thus causing the latter in an "on" status. The brake rod 250 has a protrusion 251 extended from a mediate thereof. An end portion 32 of the transmission rod 30 extends from the shoulder 30M. A cylinder 34 defining a passage 34P therethrough is connected to the shoulder 30M at one end thereof by a spring 33. A protrusion 35 extends from a periphery of the cylinder 34. A rod portion 36 extends from the cylinder 34 and is connected to a carburetor (not shown) for controlling acceleration of the vehicle. The end portion 32 of the transmission rod 30 is partially received in the passage 34P of the cylinder 34 and partially surrounded by the spring 33. It should be noted that the spring 33 does not contactedly wind around the rod portion 32 but only surrounds the rod portion 32. It should be also noted that the end portion 32 of the transmission rod 30 is slidable in the cylinder 34. A rod 39 is fixedly positioned in the vehicle and has an end portion thereof received in the cylinder 34 so as to face the end portion 32 of the transmission rod 30. An electrically magnetized device 6 is fixedly positioned near the rod 39 and substantially above the cylinder 34. The electrically magnetized device 6 comprises a coil 60 wound around a ferromagnetic bar 61 which is fixedly positioned in the vehicle, a battery set 62, and a third switch C connected in series.

The third switch C is controlled by the first switch A in such a manner that if the first switch A is changed from an "off" status to an "on" status, the third switch C will be responsive to be in an "off" status. That is, if the switch C is originally in an "on" status, then the "turning on" of the first switch A will change the third switch C to an "off" status; if the switch C is originally in an "off" status, then the "turning on" of the first switch A will let the third switch C retain in the "off" status. The third switch C is also controlled by the second switch B in such a manner that if the second switch B is changed from an "off" status to an "on" status, the third switch C will be responsive to be in an "on" status, then the "turning on" of the second switch B will let the third switch C retain in the "on" status; if the switch C is originally in an "off" status, then the "turning on" of the second switch B will let the third switch C change to an "on" status. There is one confliction in controlling the third switch C, when the first switch A and the second switch B are both changed from an "off" status to an "on" status. In this invention, the switch B is set to have priority to the first switch A, i.e., when the two switches A and B are changed to an "on" status, the third switch C will change to or retain in a "on" status.

Normally, when a vehicle is initially stated, the transmission rod 30 and the brake rod 250 are not operated by the driver, therefore the first switch A is in an "on" status, and the second switch B and the third switch C are both in an "off" status as shown in FIG. 4.

When the driver accelerates, the transmission rod 30 is driven in left direction as shown in the arrow direction of FIG. 5, and the first switch A is changed from an "on" status to an "off" status, while the switches B and C retain in an "off" status. The transmission rod 30, the spring 33, and the cylinder 34 of FIG. 5 are moved a distance comparing to those of FIG. 4. It should be noted that the spring constant of the spring 33 is so selected that when the transmission rod 30 is moved to left, the spring 33 is also moved left without deformation. The cylinder 34 is moved to open an oil valve (not shown) to thus accelerate the vehicle. It should be further noted that the electrically magnetized device 6 is simplified in FIGS. 5, 6, and 7 for clearance.

When the driver brakes the vehicle but mistakenly retains his/her accelerating action, the brake rod 250 will be pulled to thus have its protrusion 251 contact and turn on the second switch B, which in turn, turns on the second switch C, thus energizing the electrically magnetized device 6 to attract the cylinder 34 to move in right direction (see an arrow) as shown in FIG. 6, thus stopping an acceleration. At the same time, the spring 33 will be depressed by a right direction force from the cylinder 34 and a left direction force from the mediate 30M of the transmission rod 30. The depression of the spring 33 results in a tension which forces the driver to release his/her foot sole and the transmission rod 30 is returned to its original status as shown in FIG. 7. Therefore, when the driver simultaneously accelerates and brakes, the braking function has the priority to the accelerating function.

FIG. 7 illustrates the relative positions of the transmission rod 30, the brake rod 250, and the electrically magnetized device 6, when the driver stops accelerating and brakes. In this situation, the transmission rod 30 retains the same as it is in FIG. 4, while the brake rod 250 and the electrically magnetized device 6 remain the same as those in FIG. 6, i.e., the protrusion 251 of the brake rod contacts the second switch B thus causing both the second switch B and the third switch C to be in an "on" status. After the driver releases the brake, the brake rod 250 moves back to its original position as it is in FIG. 4, and the vehicle returns to the non-acceleration and non-braking status as shown in FIG. 4.

Figure 8:
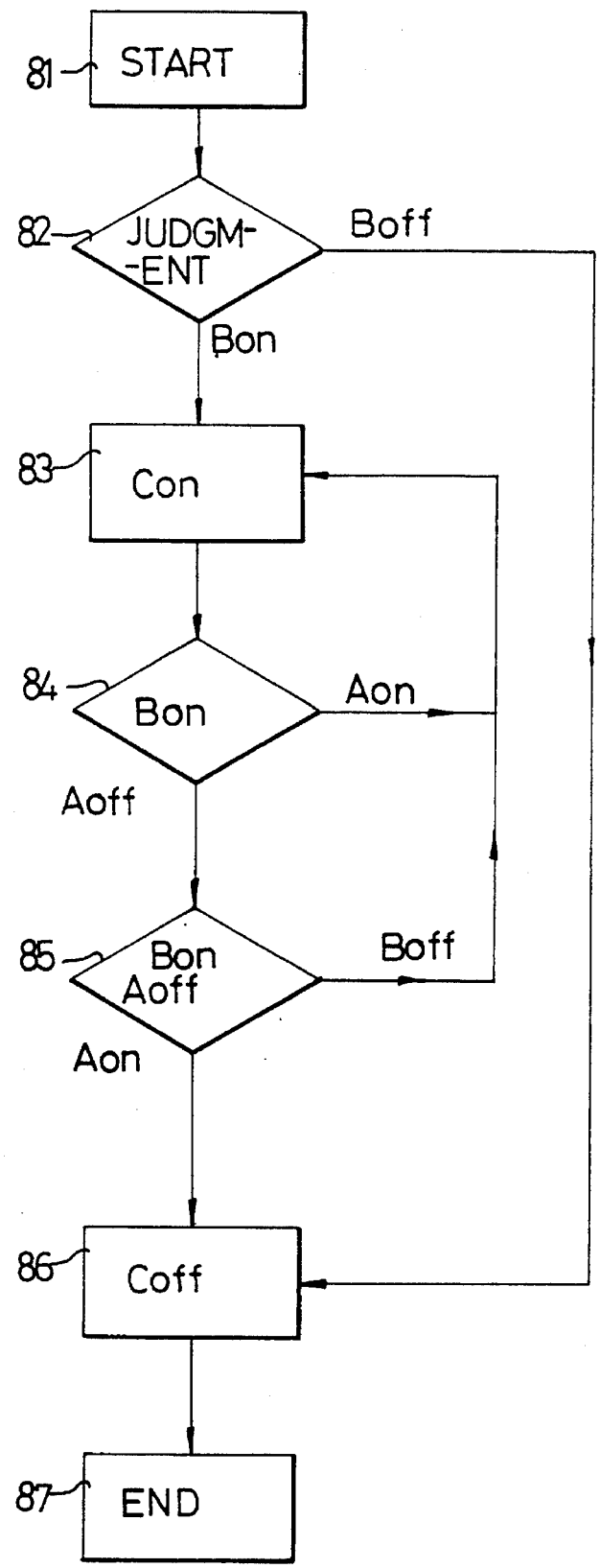
FIG. 8 is an schematic flow chart illustrating the operation of the present invention relating to status es of the first switch A, the second switch B, and the third switch C.

FIG. 8 illustrates the relations of the three switches A, B, and C for illustrating the operation of the second embodiment of the present invention. Block 81 is a "start" block illustrates the engine of the vehicle is initially started. Block 82 is a judgment block for judging the status of the second switch B. If the second switch B is in an "off" status, the procedure will be forwarded to block 86 where the third switch C is set to be in an "off" status. If the second switch B is in an "on" status after the judgment from block 82, the procedure is forwarded to block 83, where the third switch C is set to be in an "on" status. The procedure is forwarded from block 83 to block 84, where the first switch A is judged. If the first switch A is judged to be in an "on" status in block 84, the procedure is returned to block 83, otherwise the procedure is forwarded to block 85, where the two switches A and B are judged. If the second switch B is judged to be in an "off" status in block 85, the procedure is returned to block 83. If the first switch A is judged to be in an "on" status in block 85, the procedure is forwarded to block 86, where the third switch C is set to be in an "off" status. After block 86, the procedure is forwarded to block 87, where the engine is turned off the driver.

It should be noted that the second embodiment is merely used to prevent danger when the driver inadvertently controls the vehicle incorrectly.

I claim:

1. A combined accelerating/braking apparatus of a vehicle comprising a substantially hook-shaped rod which includes a first end, a first elbow, a second elbow, a third elbow, a fourth elbow, and a second end, where the fourth elbow is pivotally connected to a wall in the vehicle;

a pedal being pivotally connected to the first elbow of the hook-shaped rod;

a bracket which is secured to a wall of the vehicle and includes a fork having two prongs and defining a slot between said two prongs for detachably located the second elbow of the hook-shaped rod;

a first torsion spring being biased between the pedal and a rod portion between the first elbow and the second elbow of the hook-shaped rod for providing a recovery tension when the pedal is pivotally depressed by a driver's foot sole with respect to the first elbow of the hook-shaped rod;

a second torsion spring being biased between a wall of the vehicle and a rod portion between the third elbow and the fourth elbow of the hook-shaped rod for providing a recovery tension when the hook-shaped rod is pivotally moved with respect to the fourth elbow thereof;

whereby the pedal is pivotally depressed by a driver's foot sole with respect to the first elbow of the hook-shaped rod for acceleration, the hook-shaped rod is pivotally moved with respect to the fourth elbow of the hook-shaped rod for braking when the pedal is depressed by the driver's heel.

2. A combined accelerating/braking apparatus as claimed in claim 1, wherein each of said prongs defined a hole therethrough, each said hole tapered from an outer opening thereof to an inner opening thereof, said inner opening being adjacent to said slot, said outer opening being threaded, a ball, a spring and a threaded bolt being inserted into each said hole, said ball having a portion protruding from said inner opening of said hole, said spring being abutted between said ball and said threaded bolt, said bolt being threaded into said outer opening, two recessed being oppositely defined in said second elbow of said hook-shaped rod and each recess receiving a corresponding ball on the protruding portion thereof.

3. A combined accelerating/braking apparatus as claimed in claim 1 further comprising two protrusions extended from said second elbow and in contact with a periphery of said bracket preventing said second elbow from moving backward to the driver.

4. A combined accelerating/braking apparatus as claimed in claim 1 further comprising a first switch being fixedly positioned in the vehicle;

a brake rod connected to the second end of the hook-shaped rod, with a protrusion extended from a mediate portion of the brake rod;

a second switch being fixedly positioned in the vehicle and near the protrusion of the brake rod;

a bar fixedly positioned in the vehicle;

a cylinder made of ferromagnetic material defining a passage therethrough, including a protrusion extended from a periphery thereof, and being slidably positioned and retained around a portion of the bar;

a transmission rod connected to the pedal, a mediate of the transmission rod being formed as an enlarged block, a rod portion extended from the enlarged block and slidably received in the passage of the cylinder thus facing an end of the bar, a protrusion extended from the enlarged block and contacting and turning on the first switch;

a spring connected between the cylinder and the enlarged block of the transmission rod and surrounding the rod portion of the transmission rod;

an electrically magnetized device fixedly positioned in the vehicle and near the protrusion of the cylinder;

whereby when the brake rod and the transmission rod are operated simultaneously to brake and accelerate the vehicle, the second switch is contacted and turned on by the protrusion of the brake rod thus actuating the electrically magnetized device to attract the cylinder thus preventing the vehicle from acceleration, meanwhile the spring is depressed by a force transmitted from the enlarged block of the transmission rod.

5. A combined accelerating/braking apparatus as claimed in claim 4, wherein the electrically magnetized device comprises a coil wound around a ferromagnetic bar which is fixedly positioned in the vehicle, a battery set, and a third switch connected in series, whereby the third switch is turned on responsive to an on status of the second switch and is turned off responsive to an on status of the first switch, while the third switch is turned on when the first switch and the second switch are simultaneously turned on.

* * * * *